US012351378B2

(12) United States Patent
Nagashima et al.

(10) Patent No.: US 12,351,378 B2
(45) Date of Patent: Jul. 8, 2025

(54) ALUMINUM-CANNED WINE AND ALUMINUM CAN TO BE FILLED WITH WINE

(71) Applicant: DAIWA CAN COMPANY, Tokyo (JP)

(72) Inventors: Akira Nagashima, Tokyo (JP); Koichiro Nakamura, Sagamihara (JP); Sin Ou, Tokyo (JP)

(73) Assignee: DAIWA CAN COMPANY, Tokyo (JP)

( * ) Notice: Subject to any disclaimer, the term of this patent is extended or adjusted under 35 U.S.C. 154(b) by 37 days.

(21) Appl. No.: 18/470,939

(22) Filed: Sep. 20, 2023

(65) Prior Publication Data

US 2024/0010388 A1 Jan. 11, 2024

Related U.S. Application Data

(63) Continuation of application No. PCT/JP2021/013904, filed on Mar. 31, 2021.

(51) Int. Cl.
*B65D 6/00* (2006.01)
*B65D 23/02* (2006.01)
*B65D 81/28* (2006.01)

(52) U.S. Cl.
CPC ............... *B65D 7/42* (2013.01); *B65D 23/02* (2013.01); *B65D 81/28* (2013.01)

(58) Field of Classification Search
CPC .......... B65D 7/42; B65D 23/02; B65D 81/28; B32B 2255/06; B32B 2255/26;
(Continued)

(56) References Cited

U.S. PATENT DOCUMENTS 5,573,133 A * 11/1996 Park ................... B65D 21/0228
D9/518
7,740,148 B2 * 6/2010 Rajagopalan .......... B65D 17/02
220/608
(Continued)

FOREIGN PATENT DOCUMENTS

EP 3747790 A1 12/2020
JP H02-76565 A 3/1990
(Continued)

OTHER PUBLICATIONS

International Search Report dated Jun. 1, 2021 received in PCT/JP2021/013904.
(Continued)

*Primary Examiner* — Kareen K Thomas
(74) *Attorney, Agent, or Firm* — Scully, Scott, Murphy & Presser, P.C.

(57) ABSTRACT

An aluminum-canned wine comprising: an aluminum can including an aluminum sheet, a resin film provided on a surface of the aluminum sheet which faces an internal space of the aluminum can, and an adhesive layer interposed between the aluminum sheet and the resin film and bonding the aluminum sheet and the resin film together, wherein the resin film includes a first resin layer as a topmost layer and a second resin layer containing a dimer acid-copolymerized polyester resin, and wherein at least one of the resin layers constituting the resin film, and/or the adhesive layer contains calcium carbonate; and a wine enclosed in the aluminum can and containing 4.3 mg/L or less of molecular $SO_2$ and 350 mg/L or less of chloride ions.

8 Claims, 3 Drawing Sheets

(58) Field of Classification Search
CPC .......... B32B 2307/714; B32B 2439/66; B32B 2439/70; B32B 7/12; B32B 15/09; B32B 15/20; B32B 27/08; B32B 27/36; C12G 1/00; C12H 1/22
See application file for complete search history.

(56) References Cited

U.S. PATENT DOCUMENTS

| | | | |
|---|---|---|---|
| 8,365,960 B1* | 2/2013 | Kalaouze | B65D 81/3211 |
| | | | 206/229 |
| 8,540,105 B2* | 9/2013 | Yasui | B65D 17/4012 |
| | | | 206/508 |
| 2004/0028778 A1 | 2/2004 | Stokes et al. | |
| 2014/0151321 A1* | 6/2014 | Chang | B65D 65/42 |
| | | | 428/34.4 |
| 2014/0299566 A1* | 10/2014 | Takatomi | B65D 7/42 |
| | | | 413/1 |
| 2021/0121936 A1 | 4/2021 | Ohkoshi et al. | |
| 2021/0300621 A1 | 9/2021 | Ohkoshi et al. | |

FOREIGN PATENT DOCUMENTS

| | | |
|---|---|---|
| JP | 2005-503971 A | 2/2005 |
| JP | 2006-007746 A | 1/2006 |
| JP | 2006-062688 A | 3/2006 |
| JP | 4514119 B2 | 7/2010 |
| JP | 2011-016570 A | 1/2011 |
| JP | 2019-131275 A | 8/2019 |
| WO | 2003/029089 A1 | 4/2003 |
| WO | 2020017311 A1 | 1/2020 |
| WO | 2020017466 A1 | 1/2020 |

OTHER PUBLICATIONS

Translation of the International Preliminary Report on Patentability dated Oct. 3, 2023 and Written Opinion of the International Searching Authority dated Jun. 1, 2021 received in PCT/JP2021/013904.
Japanese Office Action dated Aug. 6, 2024 received in 2023-510051.
Extended European Search Report dated Dec. 4, 2024 received in 21934926.3.

* cited by examiner

ALUMINUM-CANNED WINE AND ALUMINUM CAN TO BE FILLED WITH WINE

CROSS-REFERENCE TO RELATED APPLICATIONS

This application is a Continuation Application of PCT Application No. PCT/JP2021/013904 filed Mar. 31, 2021, the entire contents of which are incorporated herein by reference.

FIELD

The present invention relates to an aluminum-canned wine and an aluminum can to be filled with a wine.

BACKGROUND

Wines generally contain a proper amount of sulfite as an essential additive for the suppression of wild yeast during juice fermentation and for the control of aging. Filling an aluminum can with such a wine may cause problems wherein the aluminum can is easily corroded due to the corrosiveness of sulfite added to the wine and wherein a redox reaction occurs between the sulfite and aluminum to generate hydrogen sulfide, which degrades the wine flavor.

Sulfite added to wine is partly present as "combined sulfite", bonded to saccharide, aldehyde, anthocyanin, etc., and the remaining sulfite is present as "free sulfite". A major part of free sulfite takes the form of $HSO_3^-$ (bisulfite ion), while the other part takes the form of $SO_2$ (molecular $SO_2$). The abundance ratio between the bisulfite ions and the molecular $SO_2$ varies according to pH.

For example, Patent Literature 1 is directed to a method for packaging a wine in an aluminum can, and discloses production of a wine containing less than 35 ppm free sulfite, less than 300 ppm chloride, and less than 800 ppm sulfate, and application of corrosion resistant coating onto the inner surface of an aluminum can.

CITATION LIST

Patent Literature

Patent Document 1: International Publication No. 03/029089

SUMMARY

Technical Problem

In view of the above problems, the objects of the present invention include providing an aluminum-canned wine and an aluminum can to be filled with a wine which are less likely to cause corrosion of the aluminum can and deterioration of the wine flavor.

Solution to Problem

The present inventors have discovered that a combination of a specific coating on the inner surfaces of an aluminum can and a specific composition of a wine is a solution to the above problems (i.e., the problem of aluminum can corrosion and the problem of wine flavor deterioration) and have accomplished the present invention.

That is, according to one aspect of the present invention, there is provided an aluminum-canned wine comprising:

an aluminum can including an aluminum sheet, a resin film provided on a surface of the aluminum sheet which faces an internal space of the aluminum can, and an adhesive layer interposed between the aluminum sheet and the resin film and bonding the aluminum sheet and the resin film together, wherein the resin film includes a first resin layer as a topmost layer and a second resin layer containing a dimer acid-copolymerized polyester resin, and wherein at least one of the resin layers constituting the resin film, and/or the adhesive layer contains calcium carbonate; and a wine enclosed in the aluminum can and containing 4.3 mg/L or less of molecular $SO_2$ and 350 mg/L or less of chloride ions.

According to another aspect of the present invention, there is provided an aluminum can to be filled with a wine, the aluminum can comprising:

an aluminum sheet, a resin film provided on a surface of the aluminum sheet which faces an internal space of the aluminum can, and an adhesive layer interposed between the aluminum sheet and the resin film and bonding the aluminum sheet and the resin film together, wherein the resin film includes a first resin layer as a topmost layer and a second resin layer containing a dimer acid-copolymerized polyester resin, and at least one of the resin layers constituting the resin film, and/or the adhesive layer contains calcium carbonate.

Advantageous Effects of Invention

With the present invention, an aluminum-canned wine and an aluminum can to be filled with a wine which are less likely to cause corrosion of the aluminum can and deterioration of the wine flavor can be provided.

DETAILED DESCRIPTION

Figure 1:
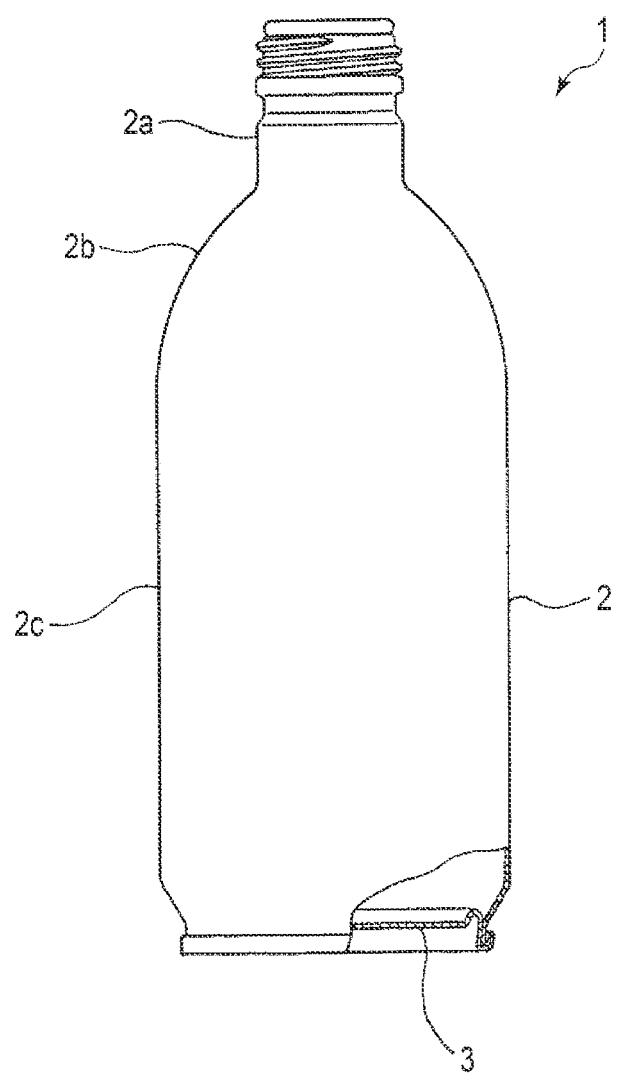
FIG. 1 is a partially cutaway side view of an exemplary aluminum can to be filled with a wine.

The present invention will be described. The description will be given for the appreciation of the invention, and is not intended to limit the invention.

1. Aluminum-Canned Wine

According to one aspect, an aluminum-canned wine is provided, and this aluminum-canned wine includes:

an aluminum can including an aluminum sheet, a resin film provided on a surface of the aluminum sheet which faces an internal space of the aluminum can, and an adhesive layer interposed between the aluminum sheet and the resin film and bonding them together, wherein the resin film includes a first resin layer as a topmost layer and a second resin layer containing a dimer acid-copolymerized polyester resin, and wherein at least one of the resin layers constituting the resin film, and/or the adhesive layer contains calcium carbonate; and a wine enclosed in the aluminum can and containing 4.3 mg/L or less of molecular $SO_2$ and 350 mg/L or less of chloride ions.

As stated above, the present invention is able to suppress the occurrence of corrosion of an aluminum can and deterioration of wine flavor by adopting a combination of a specific coating (i.e., the aforementioned resin film) on the inner surfaces of the aluminum can and a specific composition (i.e., the aforementioned molecular $SO_2$ concentration and chloride ion concentration) of a wine.

An aluminum-canned wine may be produced by filling an aluminum can body with a wine and then subjecting the aluminum can body to screwing on and securing of a separately provided cap according to a known screwing-and-securing step.

A description will be given of a "wine" having a specific composition and an "aluminum can" including a specific coating on its inner surfaces.

1-1. Wine

A wine to be enclosed in the aluminum can contains 4.3 mg/L or less of molecular $SO_2$ and 350 mg/L or less of chloride ions.

In the disclosure herein, a "molecular $SO_2$ concentration" refers to a value calculated with the following formula.

$$[\text{Molecular SO}_2 \text{ concentration (mg/L)}] = \frac{[\text{Free sulfite concentration (mg/}L)]}{\left(1 + 10^{(pH - pK\ a)}\right)}$$

$$pKa = 1.9499 + a * 0.0322 + b * 0.01971$$

$a$ = Temperature difference from 20° C. ($T$° C.−20° C.)

$b$ = Difference from 0% vol./vol. alcohol ($c$%−10)

Values of a "pH", an "alcohol concentration", and a "free sulfite concentration" for use in the calculation of a molecular $SO_2$ concentration refer to values measured as follows.

A "pH" refers to a value measured by a pH meter for a wine having a temperature of 20° C. An "alcohol concentration" refers to a value measured by liquid chromatography. A "free sulfite concentration" refers to a value measured by an aeration distillation and titration method (Rankine's method).

The molecular $SO_2$ concentration of the wine is 0 to 4.3 mg/L, preferably 1 to 3 mg/L, and more preferably 1 to 2 mg/L. If the molecular $SO_2$ concentration of the wine exceeds 4.3 mg/L, the likelihood of occurrence of corrosion of the aluminum can and deterioration of the wine flavor increases.

In the disclosure herein, a "chloride ion concentration" refers to a value measured by a potentiometric titration method.

The chloride ion concentration of the wine is 0 to 350 mg/L, preferably 0 to 200 mg/L, and more preferably 0 to 100 mg/L. If the chloride ion concentration of the wine exceeds 350 mg/L, the likelihood of occurrence of corrosion of the aluminum can and deterioration of the wine flavor increases.

1-2. Aluminum Can

FIG. 1 shows one example of aluminum cans to be filled with a wine (which may be simply called "aluminum cans" below). An aluminum can 1 shown in FIG. 1 includes a container body 2, a bottom lid 3, and a cap (not shown in the figure). The container body 2 and the bottom lid 3 may together be called an "aluminum can body". The container body 2 integrally includes a spout neck portion 2a, a shoulder portion 2b, and a trunk portion 2c. The bottom lid 3 is integrally seamed and fixed to the container body 2 so as to close the lower opening of the trunk portion 2c. Although not shown in the figure, a pilfer-proof cap, which is a separate component, is attached to the spout neck portion 2a by a well-known roll-on forming process with a capper, so that the pilfer-proof cap will be able to re-seal (re-close) the spout neck portion 2a by screwing. FIG. 1 shows an example of a three-piece type bottle can, but the aluminum can 1 may be a two-piece type bottle can, that is, a bottle can constituted by a container body 2 and a bottom lid 3 formed integrally with each other.

The aluminum can 1 has the below described resin coating on its inner surfaces (i.e., the inner surface of the container body 2, the inner surface of the bottom lid 3, and the inner surface of the cap) in order to prevent corrosion of the aluminum can. The aluminum can 1 may also have a resin coating on its outer surfaces (i.e., the outer surface of the container body 2, the outer surface of the bottom lid 3, and the outer surface of the cap).

More specifically, the aluminum can includes an aluminum sheet, a resin film provided on a surface of the aluminum sheet which faces an internal space of the aluminum can, and an adhesive layer interposed between the aluminum sheet and the resin film and bonding them together, wherein:

the resin film includes a first resin layer as a topmost layer and a second resin layer containing a dimer acid-copolymerized polyester resin, and at least one of the resin layers constituting the resin film, and/or the adhesive layer contains calcium carbonate.

Figure 2:
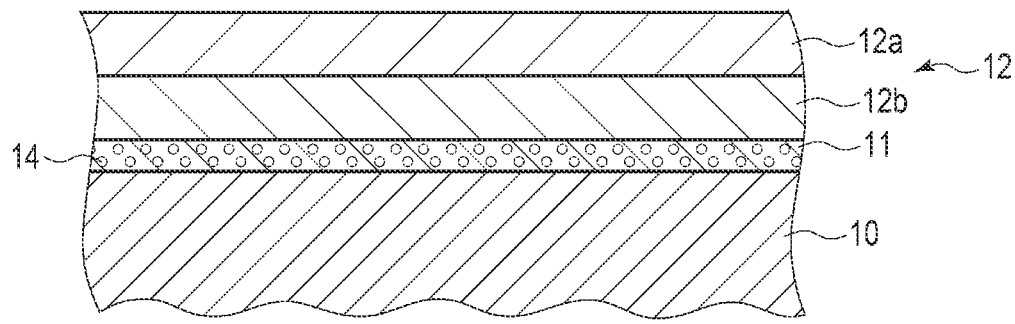
FIG. 2 is a sectional view of an exemplary layer structure of the aluminum can to be filled with a wine.
Figure 3:
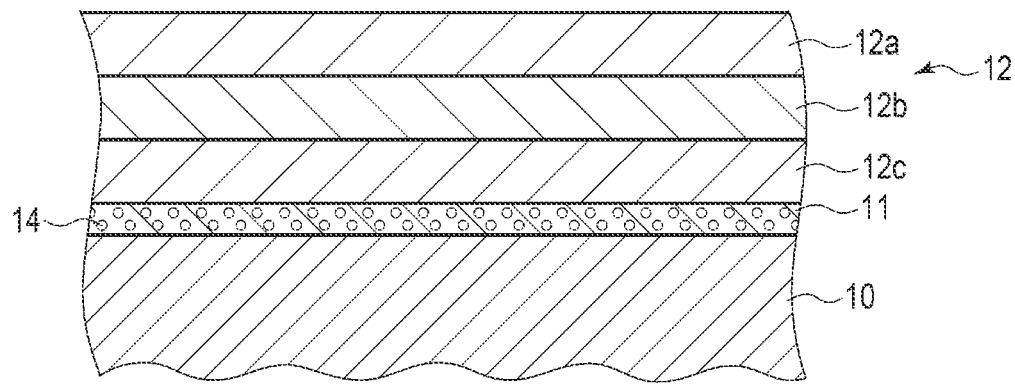
FIG. 3 is a sectional view of another exemplary layer structure of the aluminum can to be filled with a wine.

An example of such a layer structure of the aluminum can is shown in FIG. 2, and another example of the layer structure of the aluminum can is shown in FIG. 3.

The aluminum can having the layer structure shown in FIG. 2 (which may be called an "aluminum can according to the first embodiment") includes an aluminum sheet 10, a resin film 12 provided on a surface of the aluminum sheet 10 which faces an internal space of the aluminum can, and an adhesive layer 11 interposed between the aluminum sheet 10 and the resin film 12 and bonding them together, wherein:

the resin film 12 is a laminate film having a two-layered structure constituted by a first resin layer 12a as a topmost layer and a second resin layer 12b containing a dimer acid-copolymerized polyester resin, and the adhesive layer 11 contains calcium carbonate 14.

The aluminum can having the layer structure shown in FIG. 3 (which may be called an "aluminum can according to the second embodiment") includes an aluminum sheet 10, a resin film 12 provided on a surface of the aluminum sheet 10 which faces an internal space of the aluminum can, and an adhesive layer 11 interposed between the aluminum sheet 10 and the resin film 12 and bonding them together, wherein:

the resin film 12 is a laminate film having a three-layered structure constituted by a first resin layer 12a as a topmost layer, a second resin layer 12b as an intermediate layer containing a dimer acid-copolymerized polyester resin, and a third resin layer 12c as an outermost layer facing the adhesive layer 11, and the adhesive layer 11 contains calcium carbonate 14.

The aluminum can according to the first embodiment is the same as the aluminum can according to the second embodiment except that it omits the third resin layer 12c included in the aluminum can according to the second embodiment. Hence, the description will concentrate on the aluminum can according to the second embodiment.

1-2-1. Resin Film 12

In the second embodiment, the resin film 12 provided on the surface of the aluminum sheet 10 which faces an internal space of the can is a laminate film having a three-layered structure. As shown in the figure, this three-layered laminate film is constituted by the first resin layer 12a, the second resin layer 12b, and the third resin layer 12c. More specifically, the first resin layer 12a may be a resin film consisting mainly of (i.e., containing 50 mass % or more of) an isophthalic acid-copolymerized polyester resin that contains 3 to 15 mol % of isophthalic acid with respect to the total acid content in the first resin layer 12a. The second resin layer 12b may be a resin film consisting mainly of (i.e., containing 50 mass % or more of) a dimer acid-copolymerized polyester resin that contains 5 to 50 mol % of dimer acid with respect to the total acid content in the second resin layer 12b. The third resin layer 12c may be a resin film consisting mainly of (i.e., containing 50 mass % or more of) an isophthalic acid-copolymerized polyester resin containing 3 to 15 mol % of isophthalic acid with respect to the total acid content in the third resin layer 12c. The first resin layer 12a, the second resin layer 12b, and the third resin layer 12c each have a thickness of, for example, 3 to 10 μm. It is preferable for the resin film 12 to have a dimer acid ratio of 3 to 30 mol % to the total acid content in the entire film.

Because of the inclusion of the dimer acid-copolymerized polyester resin in this laminate film of a three-layered structure, the resin film 12 can be made flexible. Use of such a resin film 12 having a good flexibility realizes an excellent film formability, and prevents occurrences of film rupture (hair) and scraping (galling) during the drawing and ironing processes in the manufacturing of cans. Further, use of the resin film 12 can avoid breakage of film surfaces and suppress corrosion of aluminum cans, even in the event of dropping of cans or an external impact (dent) on cans after the cans have been provided as finished products with contents enclosed therein. That is, the quality associated with the inner surface side of the aluminum cans can be assured.

Also, although the second resin layer 12b containing the dimer acid-copolymerized polyester resin may be sticky at high temperature and flexible and easily damaged at room temperature, the three-layered laminate film ensures that the second resin layer 12b is sandwiched between the first resin layer 12a and the third resin layer 12c, each of which contains the isophthalic acid-copolymerized polyester resin. Thus, improved usability for the resin film 12 can be realized. Put another way, the first resin layer 12a and the third resin layer 12c do not become sticky even at high temperature and are relatively robust at room temperature, and therefore, they will not cause a problem of winding around a high-temperature stretching roll during the film formation, nor will they become damaged at the time of conveyance during the formation of aluminum cans, etc. Besides, problems such as winding around a stretching roll and damage at the time of conveyance for aluminum cans are often solvable by special measures such as subjecting the component located at the source of trouble to a surface treatment, or by other measures such as reduction of production speed. In these cases, the first resin layer 12a and the third resin layer 12c may be omitted according to the technical measures taken in production.

While not shown in the figures, a resin film may be provided on the surface of the aluminum sheet 10 which faces an external space (an exterior) of the can. This outer-surface-side resin film may be, for example, a blended resin containing polybutylene terephthalate and isophthalic acid-copolymerized polyethylene terephthalate (PBT/copolymerized PET). The outer-surface-side resin film has a thickness of, for example, 5 to 20 μm.

1-2-2. Adhesive Layer 11

The resin film 12 described above may be bonded to the aluminum sheet 10 via the adhesive layer 11. The adhesive layer 11 may be, for example, an adhesive made of a thermosetting epoxy resin. It is preferable for the adhesive layer 11 not to contain a bisphenol-A epoxy resin. A bisphenol-A epoxy resin is suspected to be an endocrine disrupter substance. Thus, the absence of a bisphenol-A epoxy resin is desirable for the sake of reliably avoiding elution of any bisphenol-A epoxy resin into the contents of can containers. In order to enhance the adhesion properties without containing a bisphenol-A epoxy resin, it is preferable to, for example, set the content ratio (mass ratio) of a polyester resin to a phenol resin to be [10 to 40]:[0 to 20]. The adhesive layer 11 has a thickness, for example, of 2 to 20 μm.

In the first and second embodiments, the calcium carbonate 14 is contained in the form of particles in the adhesive layer 11. The calcium carbonate 14 functions as an acid scavenger which reacts with sulfite. The calcium carbonate 14 is thus able to prevent the sulfite contained in wines from passing through the resin film 12 and reaching the aluminum sheet 10. This consequently allows for the prevention of corrosion of aluminum cans and also the prevention of deterioration of wine flavor due to hydrogen sulfide generated by the reaction between sulfite and aluminum.

The particles of the calcium carbonate 14 have an average particle size of, for example, 0.01 to 4.0 μm, preferably 0.01 to 0.1 μm. The calcium carbonate 14 may be added in an amount of, for example, 5 to 50 parts by mass with respect to the adhesive resin being 100 parts by mass. A too small amount of the added calcium carbonate could incur degradation of the above described effects, and a too large amount of the added calcium carbonate could incur degradation of the formability of the resin film 12.

It is preferable that the calcium carbonate 14 be contained in the adhesive layer 11. This enables the calcium carbonate 14 to effectively catch the sulfite contained in wines. The calcium carbonate 14 may also be contained in any of the layers in the resin film 12, in addition to being contained in the adhesive layer 11. In other instances, the calcium carbonate 14 may be contained in any of the layers in the resin film 12, instead of being contained in the adhesive layer 11. In this case, it is preferable that the resin film 12 be constituted by multiple layers, and that the calcium carbonate 14 be contained in a layer different from the topmost layer. With the calcium carbonate 14 contained in a layer different from the topmost layer of the resin film 12, it is possible to eliminate the risk of creating micro defects during the formation of aluminum cans.

1-2-3. Details of Resin Film 12

Details of the resin film 12 according to the second embodiment will be described.

<First Resin Layer 12a>

The first resin layer 12a may be a resin film containing, at a content of, e.g., 50 to 100 mass %, an isophthalic acid-copolymerized polyester resin that contains 3 to 15 mol % of isophthalic acid with respect to the total acid content in the first resin layer 12a. Such a resin film has a property of not being sticky at approximately 130° C.

The isophthalic acid-copolymerized polyester resin includes, for example, a dicarboxylic acid unit containing 85 to 97 mol % of a terephthalic acid component and 15 to 3 mol % of an isophthalic acid component, and a diol unit containing 90 mol % or more of an ethylene glycol component. That is, the isophthalic acid-copolymerized polyester resin consists, for example, mainly of ethylene terephthalate in which 3 to 15 mol % of the isophthalic acid component is copolymerized. Copolymerization of the isophthalic acid component can endow the film with flexibility. Accordingly, it is possible to prevent occurrences of tiny cracks on the surfaces of aluminum cans during their formation.

The isophthalic acid-copolymerized polyester resin may also contain a dicarboxylic acid unit other than the terephthalic acid component and the isophthalic acid component within a range that does not impair the adequacy of lamination to the aluminum sheet and the properties of the aluminum cans, for example, within a range of 10 mol % or less. Examples of such a dicarboxylic acid unit include succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination.

The isophthalic acid-copolymerized polyester resin may contain a diol unit other than the ethylene glycol component within a range of 10 mol % or less. Examples of such a diol unit include aliphatic diols such as diethylene glycol, triethylene glycol, 1,2-propanediol, 1,3-propanediol, 1,4-butanediol, 1,5-pentanediol, 1,6-hexanediol, and neopentyl glycol, alicyclic diols such as 1,4-cyclohexanedimethanol and 1,4-cyclohexanediethanol, and so on, any one of which may be used independently or two or more of which may be used in combination.

The isophthalic acid-copolymerized polyester resin is obtained by inducing an esterification reaction of the above described dicarboxylic acid component with the above described diol component by a known method. For example, this method may be a method of using the dicarboxylic acid component that has a methyl group added to its terminal as a starting material, and causing an ester exchange reaction with the diol component through addition of a catalyst, or a method of using the dicarboxylic acid component without a modified terminal as a starting material and causing an esterification reaction directly with the diol component. For other instances, a commercially available isophthalic acid-copolymerized polyethylene terephthalate resin may be employed, examples of which include IP121B, PIFG8, and PIFG10 (all from Bell Polyester Products, Inc.). While it is not a particular requirement for the isophthalic acid-copolymerized polyester resin to have a specific limiting viscosity, its limiting viscosity is preferably 0.7 to 0.9.

The isophthalic acid-copolymerized polyester resin described above may be used alone in the form of a film, or may be used together with a single polyester resin or multiple polyester resins, e.g., a polyethylene terephthalate resin, a polybutylene terephthalate resin, a polytrimethylene terephthalate resin, etc., which may be blended in a proportion of less than 50 mass % with respect to the isophthalic acid-copolymerized polyester resin.

<Second Resin Layer 12b>

The second resin layer 12b may be a resin film containing a dimer acid-copolymerized polyester resin at a content of, for example, 50 to 100 mass %.

The dimer acid-copolymerized polyester resin, for example, includes:
(A) 50 to 93 mass % of an ester oligomer which contains
 (a1) a dicarboxylic acid unit containing 70 mol % or more of a terephthalic acid component and
 (a2) a diol unit containing 70 mol % or more of an ethylene glycol component, and
 which has a number-average molecular weight of 700 or less; and
(B) 7 to 50 mass % of a polyester polyol which contains
 (b1) a hydrogenated dimer acid unit and
 (b2) a 1,4-butanediol unit, and
 which has a number-average molecular weight of 1500 to 3000.

(Ester Oligomer (A))

In the above dimer acid-copolymerized polyester resin, the dicarboxylic acid unit (a1) contains 70 mol % or more of a terephthalic acid unit. The entirety of the dicarboxylic acid unit may be a terephthalic acid unit. Or, a dicarboxylic acid component other than the terephthalic acid unit may be contained within a range that does not impair the adequacy of lamination to the aluminum sheet and the properties of the aluminum cans for formation, and within a range of less than 30 mol %. Examples of this dicarboxylic acid component other than the terephthalic acid unit include isophthalic acid, succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination. Among these, for example, isophthalic acid may be suitably used within a range of about 1 to 30 mol %, for enhancing the dent resistant characteristics (i.e., properties of avoiding breakage of film surfaces so that corrosion of an aluminum sheet does not easily occur, even if an external shock (dent) is applied) of the aluminum cans having a film coating.

In the above dimer acid-copolymerized polyester resin, the diol unit (a2) contains 70 mol % or more of an ethylene glycol unit. The entirety of the diol unit may be an ethylene glycol unit. Or, a diol component other than the ethylene glycol unit may be contained within a range of less than 30 mol %. Examples of the diol component other than the ethylene glycol unit include propylene glycol, butanediol, neopentyl glycol, diethylene glycol, cyclohexane dimethanol, and so on, any one of which may be used independently or two or more of which may be used in combination.

In the dimer acid-copolymerized polyester resin described above, the number-average molecular weight of the ester oligomer (A) is 700 or less, preferably 300 to 700. By conducting copolymerization using the ester oligomer (A) of the number-average molecular weight of 700 or less, a copolymerized polyester resin in which the polyester polyol (B) is randomly bonded within the polymer chains and which has a clear appearance is obtained. The copolymerized polyester resin thus obtained has good compatibility with other resins, and therefore allows for stable film formation without incurring problems such as occurrence of a surging phenomenon (unstable discharge phenomenon) when being subjected to melt-extrusion after blending with other resins.

On the other hand, if an ester oligomer having a number-average molecular weight of more than 700, for example, around 1000, is used instead, the polymerization reaction reaches a termination point in the course of copolymerization with the polyester polyol (B), and as such, cannot produce a high-viscosity copolymerized polyester resin having a limiting viscosity of about 0.7 to 0.9. Also, use of polyester having a number-average molecular weight of more than 5000 can produce a high-molecular copolymerized polyester resin without causing the polymerization stop phenomenon, but the obtained copolymerized polyester resin will be an -(A)-(B)-type block copolymer because of the large molecular weight of the ester (A) unit, and the appearance of the resin will be clouded due to phase separations. Furthermore, since such a block copolymer has poor compatibility with other resins, the problem of a surging phenomenon (unstable discharge phenomenon) occurring at the time of melt-extrusion, and sheet or film formation not being permitted, exists.

The ester oligomer (A) is obtained by inducing an esterification reaction of the dicarboxylic acid component (a1), consisting mainly of terephthalic acid, with the diol component (a2), consisting mainly of ethylene glycol, by a known method. For example, this method may be a method of acquiring the oligomer by using the dicarboxylic acid component (a1) that has a methyl group added to its terminal as a starting material and causing an ester exchange reaction with the diol component (a2) through addition of a catalyst, or a method of acquiring the oligomer by using the dicarboxylic acid component (a1) without a modified terminal as a starting material and causing an esterification reaction directly with the diol component (a2).

It is preferable in the production of the ester oligomer (A) that, after a predetermined esterification rate is reached at a reaction temperature of, for example, 230 to 250° C., an input of 3 to 10 mass % of diol (ethylene glycol) with respect to the total oligomer obtained be provided to the system so that depolymerization reaction takes place for about 30 minutes to 1 hour, with the internal temperature kept at 230 to 250° C. By carrying out the depolymerization reaction using diol (ethylene glycol) after the esterification reaction, the number-average molecular weight of the ester oligomer (A) can be adjusted to 700 or less. If, on the other hand, the depolymerization reaction is not carried out, the number-average molecular weight of the ester oligomer resulting under normal conditions will be high and exceed 700. Even in the case of omitting the depolymerization reaction, it is possible to regulate the number-average molecular weight to 700 or less by setting a molar ratio of the diol component with respect to the dicarboxylic acid component to a high range of 1.25 to 1.60; nevertheless, the number-average molecular weight would exceed 700 if the molar ratio of the diol component falls below 1.25.

(Polyester Polyol (B))

In the above dimer acid-copolymerized polyester resin, the polyester polyol (B) has a dicarboxylic acid unit constituted by the hydrogenated dimer acid unit (b1). The dimer acid refers to, for example, a dicarboxylic acid compound having 36 carbon atoms and obtained by dimerizing an unsaturated fatty acid having 18 carbon atoms such as oleic acid or linoleic acid. The hydrogenated dimer acid refers to a dimer acid in which unsaturated double bonds remaining after the dimerization have been saturated through hydrogenation, and the dicarboxylic acid unit of the polyester polyol (B) is constituted by such a hydrogenated dimer acid unit (b1). Note that the hydrogenated dimer acid is normally obtained as a mixture of compounds of a linear structure, compounds of a branched structure, compounds of an alicyclic structure, etc., and the ratio of their contents varies depending on the production processes. However, the content ratio in the context of the present invention is not particularly limited. The polyester polyol (B) also has a diol unit constituted by the 1,4-butanediol unit (b2). Here, the terminals of the polyester polyol (B) are all hydroxyl groups from the 1,4-butanediol unit (b2).

The polyester polyol (B) has a number-average molecular weight of 1500 to 3000, preferably 1800 to 2500. Having an average molecular weight in this range gives an excellent reactivity at the time of copolymerization, and also allows the obtained copolymerized polyester resin to demonstrate excellent performance as a film for coating a metal sheet. On the other hand, if the average molecular weight is less than 1500, while good reactivity at the time of copolymerization will still be observed, the obtained copolymerized polyester resin tends to provide poor dent resistant characteristics of the aluminum cans having a film coating. If the average molecular weight exceeds 3000, the reactivity at the copolymerization becomes poor, and a copolymerized polyester resin having a desired molecular weight will not be obtained.

The polyester polyol (B) can be obtained by inducing an esterification reaction of the hydrogenated dimer acid unit (b1) with the 1,4-butanediol unit (b2) by a known method, but this requires adjustment of the molar ratio for the reaction so that the terminal turns to a hydroxyl group. In another instance, a commercial product may be employed as the polyester polyol (B). For example, there exists a commercially available product named Priplast3199 (manufactured by Croda) as the polyester polyol including a hydrogenated dimer acid and 1,4-butanediol and having a number-average molecular weight of 2200. Other commercially available polyester polyol products are Priplast3162, 3192, 3196, 2101, and 2104 (all from Croda), etc.

(Copolymerized Polyester Resin)

The dimer acid-copolymerized polyester resin described above can be obtained by inducing the copolymerization reaction of 50 to 93 mass % of the ester oligomer (A) with 7 to 50 mass % of the polyester polyol (B). Here, the polyester polyol (B) accounts for a content of 7 to 50 mass %, preferably 15 to 35 mass %, of the entire polymer. The content of the polyester polyol (B) being within this range provides excellent copolymerization reactivity, and also particularly good dent resistant characteristics of the aluminum cans having a film coating. Moreover, since the copolymerized polyester resin is obtained with the polyester polyol (B) randomly bonded within its polymer chains, it has a clear and colorless, or clear and slightly yellow, appearance. On the other hand, if the content of the polyester polyol (B) is less than 7 mass %, the dent resistant characteristics of the aluminum cans having a film coating could be degraded. Also, if the content of the polyester polyol (B) exceeds 50 mass %, the copolymerization reactivity becomes poor and the obtained copolymerized polyester resin could show a whitish appearance as involving phase separations of the polyester polyol (B).

The copolymerization reaction between the ester oligomer (A) and the polyester polyol (B) may be carried out by a conventionally known method. For example, a reaction system obtained by mixing each component is gradually depressurized from atmospheric pressure to a highly vacuum condition of 133.3 Pa or below, and the series of reactions may be carried out under this condition. Desirably, the temperature during the reactions should be controlled to between 250° C. and 270° C. If the temperature exceeds 270° C., a decrease in viscosity due to deterioration may occur in the latter stage of the copolymerization reaction, and if the temperature is below 250° C., the copolymerization reaction may not proceed. The copolymerization reaction may employ a polymerization catalyst such as antimony trioxide, germanium dioxide, or a titanium compound, and it is preferable to use, among these, the titanium compound such as tetrabutyl titanate or tetraisopropoxy titanate from the viewpoint of reactivity, safety, and cost. The dimer acid-copolymerized polyester resin described above is not particularly limited to a specific limiting viscosity, but preferably has a limiting viscosity of 0.7 to 0.9.

Another method for obtaining the dimer acid-copolymerized polyester resin may be to esterify dicarboxylic acids containing 70 to 97 mol % of a terephthalic acid component and 30 to 3 mol % of a dimer acid component with diols containing 90 mol % or more of an ethylene glycol component by a known method.

The dimer acid-copolymerized polyester resin may also contain a dicarboxylic acid unit other than the terephthalic acid component and the dimer acid component within a range that does not impair the adequacy of lamination to the aluminum sheet and the properties of the aluminum cans, for example, within a range of 10 mol % or less. Examples of such a dicarboxylic acid unit include isophthalic acid, succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination.

Also, the dimer acid-copolymerized polyester resin may contain a diol unit other than the ethylene glycol component within a range of 10 mol % or less. Examples of such a diol unit include aliphatic diols such as diethylene glycol, triethylene glycol, 1,2-propanediol, 1,3-propanediol, 1,4-butanediol, 1,5-pentanediol, 1,6-hexanediol, and neopentyl glycol, alicyclic diols such as 1,4-cyclohexanedimethanol and 1,4-cyclohexanediethanol, and so on, any one of which may be used independently or two or more of which may be used in combination.

The dimer acid-copolymerized polyester resin described above may be used alone in the form of a film, or may be blended with one or more other polyester resins for use. Such other polyester resins are, for example, a polyethylene terephthalate resin, an isophthalic acid-copolymerized polyester resin, a polybutylene terephthalate resin, a polytrimethylene terephthalate resin, and so on, and any one of them may be blended alone, or multiple of them may be blended together, in a proportion of less than 50 mass % with respect to the dimer acid-copolymerized polyester resin.

<Third Resin Layer 12c>

The third resin layer 12c may be a resin film containing, at a content of, e.g., 50 to 100 mass %, an isophthalic acid-copolymerized polyester resin that contains 3 to 15 mol % of isophthalic acid with respect to the total acid content in the third resin layer 12c. The third resin layer 12c may have the same composition as the first resin layer 12a.

It is possible to add, to the copolymerized polyester resins of the first resin layer 12a, the second resin layer 12b, and the third resin layer 12c, a metallic salt such as magnesium acetate, calcium acetate, or magnesium chloride as an additive in order to gain the property of stable electrostatic adhesion to a cooling roll used in the formation of a melt-extruded film. In addition, it is also possible to mix an appropriate amount of inert particles such as silica, alumina, calcium carbonate, or titanium dioxide as an anti-blocking agent for a film roll, such inert particles preferably having an average particle size of 1.0 to 4.0 μm. The average particle size of less than 1.0 μm would incur degradation of the anti-blocking property, and the average particle size of greater than 4.0 μm would cause dropping-off of the particles due to abrasion, or film breakage during the stretching process.

The copolymerized polyester resins of the first resin layer 12a, the second resin layer 12b, and the third resin layer 12c may also contain, as needed, an additive such as a coloring pigment, wax, a heat stabilizer, an antioxidant, or an ultraviolet absorber. The antioxidant may be a hindered phenol-based antioxidant, a phosphorus-based antioxidant, a sulfur-based antioxidant, etc., but the hindered phenol-based antioxidant is particularly preferable. More than one type of such antioxidants may be added in combination, and the content of the antioxidant is preferably 100 to 5000 ppm.

<Laminate Film>

The resin film 12 can be obtained by laminating the copolymerized polyester resins of the first resin layer 12a, the second resin layer 12b, and the third resin layer 12c by a known method. For example, this method may be a method of feeding the copolymerized polyester resin of the first resin layer 12a, that of the second resin layer 12b, and that of the third resin layer 12c into respective, different extruders and co-extruding them from a single die simultaneously (co-extrusion laminating). Or, the method may be a method of preparing a film of the first resin layer 12a (or the third resin layer 12c) in advance by a T-die process or an inflation process, melt-extruding the copolymerized polyester resin of the second resin layer 12b onto the surface of this film being conveyed, solidifying the resulting product by cooling, melt-extruding the copolymerized polyester resin of the third resin layer 12c (or the first resin layer 12a) onto the surface of the obtained two-layered film being conveyed, and solidifying the resulting product by cooling (extrusion laminating). The resin film 12 is not particularly limited to a specific thickness, but the sum of the thicknesses of the first resin layer 12a, the second resin layer 12b, and the third resin layer 12c is preferably 9 to 30 μm.

2. Aluminum can to be Filled with Wine

According to another aspect, an aluminum can to be filled with a wine (an aluminum can for using as a container to be filled with a wine) is provided, and this aluminum can to be filled with a wine includes an aluminum sheet, a resin film provided on a surface of the aluminum sheet which faces an internal space of the aluminum can, and an adhesive layer interposed between the aluminum sheet and the resin film and bonding them together, wherein the resin film includes a first resin layer as a topmost layer and a second resin layer containing a dimer acid-copolymerized polyester resin, and wherein at least one of the resin layers constituting the resin film, and/or the adhesive layer contains calcium carbonate.

For details of the aluminum can to be filled with a wine, the description in the above section "1-2. Aluminum Can" may be referred to. Such an aluminum can has a specific resin film on its inner surfaces, and therefore, it excels in the respect of suppressing the occurrence of corrosion of an aluminum can and deterioration of wine flavor in the wine-filled state.

Preferred embodiments of the aluminum can to be filled with a wine will be collectively set forth.

<1> An aluminum can to be filled with a wine, the aluminum can including: an aluminum sheet, a resin film provided on a surface of the aluminum sheet which faces an internal space (an interior) of the aluminum can, and an adhesive layer interposed between the aluminum sheet and the resin film and bonding the aluminum sheet and the resin film together, wherein the resin film includes a first resin layer as a topmost layer and a second resin layer containing a dimer acid-copolymerized polyester resin, and wherein
at least one of the resin layers constituting the resin film, and/or the adhesive layer contains calcium carbonate.

<2> The aluminum can according to <1>, wherein the resin film has a two-layered structure constituted by the first resin layer and the second resin layer.

<3> The aluminum can according to <1> or <2>, wherein the first resin layer contains an isophthalic acid-copolymerized polyester resin.

<4> The aluminum can according to any one of <1> to <3>, wherein the adhesive layer contains a thermosetting epoxy resin.

<5> The aluminum can according to <1>, wherein the resin film further includes a third resin layer as an outermost layer facing the adhesive layer, and has a three-layered structure constituted by the first resin layer, the second resin layer, and the third resin layer.

<6> The aluminum can according to <5>, wherein the first resin layer contains an isophthalic acid-copolymerized polyester resin.

<7> The aluminum can according to <5> or <6>, wherein the adhesive layer contains a thermosetting epoxy resin.

<8> The aluminum can according to any one of <5> to <7>, wherein the third resin layer contains an isophthalic acid-copolymerized polyester resin.

<9> The aluminum can according to any one of <1> to <8>, wherein the adhesive layer contains calcium carbonate.

EXAMPLES

Example 1

In Example 1, storage tests were conducted where various kinds of wines were enclosed in the aluminum cans having a specific coating on their inner surfaces.
<Acquisition of pH, Alcohol Concentration, Free Sulfite Concentration, and Chloride Ion Concentration>
A pH, an alcohol concentration, a free sulfite concentration, and a chloride ion concentration were acquired for 38 kinds of wines. The pH was measured at 20° C. using a pH meter. The alcohol concentration was measured by high performance liquid chromatography. The free sulfite concentration was measured by an aeration distillation and titration method (Rankine's method). The chloride ion concentration was measured by a potentiometric titration method.
<Calculation of Molecular $SO_2$ Concentration>
From the acquired values of the pH, the alcohol concentration, and the free sulfite concentration, the molecular $SO_2$ concentration of each of the 38 kinds of wines was calculated according to the above described formula for calculating molecular $SO_2$ concentrations.
<Enclosure into Aluminum Cans>
The wines were each put in an aluminum can body to fill the same, and a separately provided cap was screwed and secured to each aluminum can body, thereby producing canned wines.
The aluminum cans used had a structure of the bottle can as shown in FIG. 1, and had a resin coating having a layer structure as shown in FIG. 3 on their inner surfaces and a resin coating on their outer surfaces. More specifically, each aluminum can body had, from the outer surface side thereof, an outer-surface-side resin film, an aluminum sheet 10, an adhesive layer 11, and a three-layered inner-surface-side resin film 12.

The three-layered inner-surface-side resin film 12 was constituted by an outer layer made of a 10 mol % isophthalic acid-copolymerized PET resin, an intermediate layer made of a 21 mol % dimer acid-copolymerized PET resin, and an inner layer made of a 10 mol % isophthalic acid-copolymerized PET resin. The inner-surface-side resin film 12 had a thickness of 25 μm. The outer layer, the intermediate layer, and the inner layer had a thickness ratio of 1:1:0.5. The adhesive layer 11 was made of a thermosetting epoxy resin and contained calcium carbonate particles. The adhesive layer 11 had a thickness of 3 μm.

The outer-surface-side resin film was made of a blended resin containing polybutylene terephthalate and isophthalic acid-copolymerized polyethylene terephthalate (PBT/copolymerized PET). The outer-surface-side resin film had a thickness of 18 μm.

The materials of the aluminum cans were prepared in the following manner. The inner-surface-side resin film was prepared by a known co-extrusion film forming method, and an adhesive resin was applied to the inner-surface-side resin film. Meanwhile, the outer-surface-side resin film was prepared by a known film forming method. These two films were then bonded to the aluminum sheet by thermocompression bonding.
<Storage and Quality Evaluation of Canned Wines>
The canned wines were stored, and subjected to quality evaluation after the storage. The storage was carried out for a period of 24 months at temperatures of 5° C., 20° C., and 38° C. The quality evaluation was performed by visual observation of corrosion states and sensory evaluation.

If, under all the storage conditions, no corrosion was observed and no deterioration of wine flavor occurred, the wine was rated as a wine feasible for filling the tested aluminum can. If corrosion was observed, or if the wine flavor deteriorated, the wine was rated as a wine not feasible for filling the tested aluminum can.
<Determination of Upper Limit Value of Molecular $SO_2$ Concentration and Upper Limit Value of Chloride Ion Concentration>
Data of each wine was plotted with reference to a horizontal axis representing the molecular $SO_2$ concentration (mg/L) and a vertical axis representing the chloride ion concentration (mg/L). Plotting of wines with good evaluation results (i.e., wines evaluated as being applicable to the tested aluminum cans) used a mark "o", and plotting of wines with poor evaluation results (i.e., wines evaluated as being inapplicable to the tested aluminum cans) used a mark "x".

Figure 4:
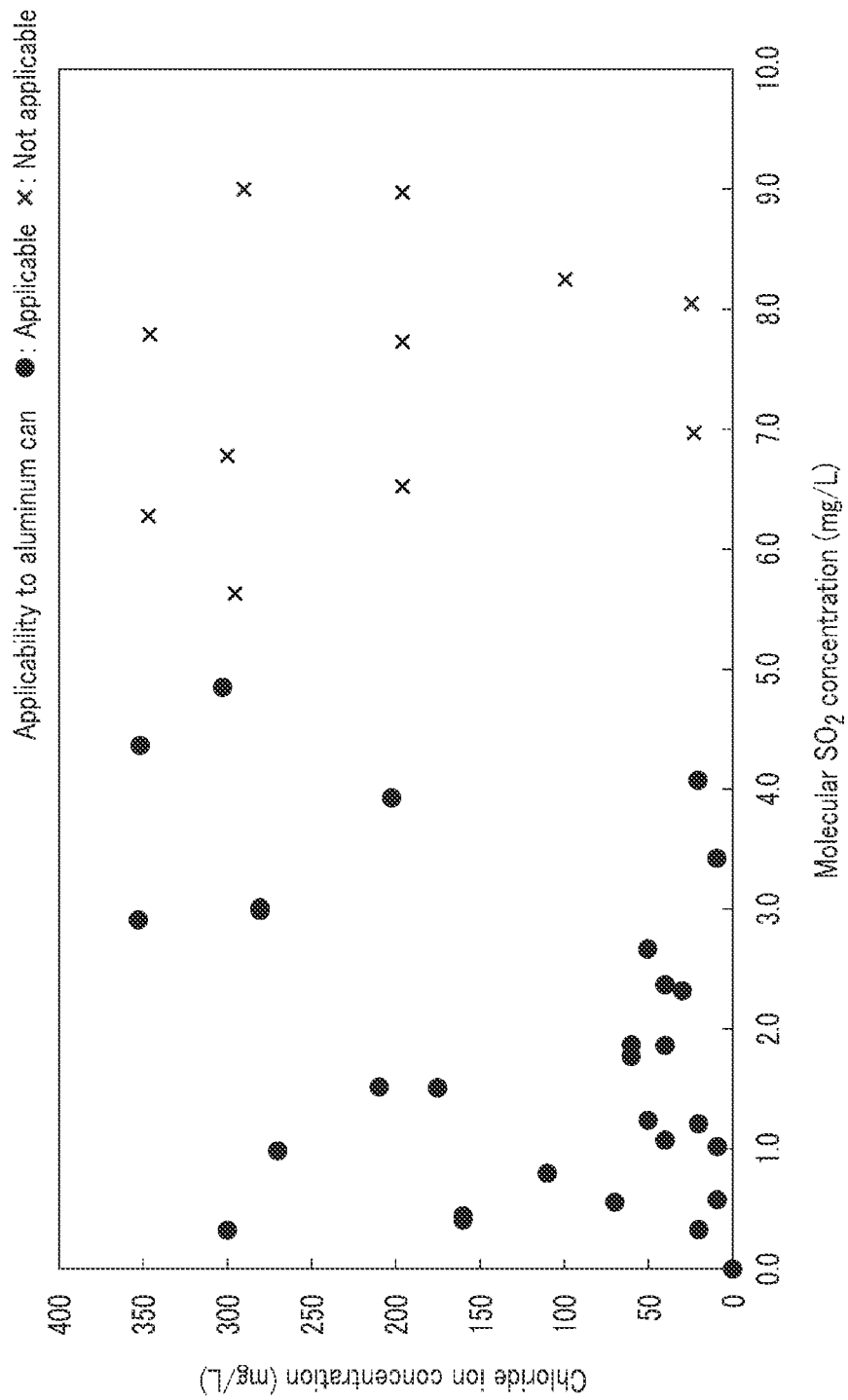
FIG. 4 is a scatter diagram expressing influences of the molecular $SO_2$ concentration and the chloride ion concentration of a wine on the applicability to the aluminum can.

FIG. 4 shows the evaluation results. It has been demonstrated by the evaluation results that in the case where a wine having a molecular $SO_2$ concentration of 4.3 mg/L or less and a chloride ion concentration of 350 mg/L or less is enclosed in the above described aluminum can having a specific coating on its inner surfaces, corrosion of the aluminum can and deterioration of the wine flavor would not occur during the storage period.

Example 2

In Example 2, storage tests were conducted where the three kinds of wines shown in Table 1 below were enclosed in the aluminum cans as used in Example 1 (which will be called "aluminum cans A") and also in another type of aluminum cans (which will be called "aluminum cans B"). The storage tests were carried out as described in the section <Storage and Quality Evaluation of Canned Wines> set forth in relation to Example 1.

The aluminum cans B had a structure of a bottle can, and had a resin coating having a layer structure as shown in FIG. 2 on their inner surfaces and a resin coating on their outer surfaces. More specifically, the body of each aluminum can B had, from the outer surface side thereof, an outer-surface-side resin film, an aluminum sheet 10, an adhesive layer 11, and a two-layered inner-surface-side resin film 12.

The two-layered inner-surface-side resin film 12 was constituted by an outer layer made of a blended resin containing polybutylene terephthalate and polyethylene terephthalate (PBT/PET) and an inner layer made of a 10 mol % isophthalic acid-copolymerized polyester resin. The inner-surface-side resin film 12 had a thickness of 20 μm. The outer layer and the inner layer had a thickness ratio of 1:1. The adhesive layer 11 was made of a thermosetting epoxy resin and contained calcium carbonate particles. The adhesive layer 11 had a thickness of 3 μm.

The outer-surface-side resin film was made of a blended resin containing polybutylene terephthalate and polyethylene terephthalate (PBT/PET). The outer-surface-side resin film had a thickness of 18 μm.

The table below shows the evaluation results.

TABLE 1

| Can | Wine | pH | Alcohol (%) | Free sulfite (mg/L) | Chloride ion (mg/L) | Result of corrosion resistance evaluation |
|---|---|---|---|---|---|---|
| Aluminum can A | Wine A | 2.9 | 8 | 24 | 170 | Not corroded |
| Aluminum can A | Wine B | 3.5 | 12 | 26 | 40 | Not corroded |
| Aluminum can A | Wine C | 3.0 | 12 | 30 | 50 | Not corroded |
| Aluminum can B | Wine A | 2.9 | 8 | 24 | 170 | Corroded |
| Aluminum can B | Wine B | 3.5 | 12 | 26 | 40 | Not corroded |
| Aluminum can B | Wine C | 3.0 | 12 | 30 | 50 | Corroded |

Wine A had a molecular $SO_2$ concentration of 2.2 mg/L and a chloride ion concentration of 170 mg/L. Wine B had a molecular $SO_2$ concentration of 0.8 mg/L and a chloride ion concentration of 40 mg/L. Wine C had a molecular $SO_2$ concentration of 2.7 mg/L and a chloride ion concentration of 50 mg/L.

The wine A that was enclosed in the aluminum can A and subjected to the storage test did not cause corrosion, while the wine A that was enclosed in the aluminum can B and subjected to the storage test caused corrosion. Similarly, the wine C that was enclosed in the aluminum can A and subjected to the storage test did not cause corrosion, while the wine C that was enclosed in the aluminum can B and subjected to the storage test caused corrosion.

It has been demonstrated by the evaluation results that, even with a wine having a molecular $SO_2$ concentration of 4.3 mg/L or less and a chloride ion concentration of 350 mg/L or less, the absence of the specific coating on the inner surfaces of the aluminum can would cause corrosion of the aluminum can during the storage period.

The results of Examples 1 and 2 show that a combination of a specific coating on the inner surfaces of the aluminum can and a specific composition of a wine can prevent corrosion of the aluminum can and deterioration of the wine flavor.

REFERENCE SIGNS LIST

1 . . . Aluminum can to be filled with wine
2 . . . Container body
2a . . . Spout neck portion
2b . . . Shoulder portion
2c . . . Trunk portion
3 . . . Bottom lid
10 . . . Aluminum sheet
11 . . . Adhesive layer
12 . . . Resin film
12a . . . First resin layer
12b . . . Second resin layer
12c . . . Third resin layer
14 . . . Calcium carbonate

What is claimed is:

1. An aluminum-canned wine comprising:
an aluminum can having a structure of a bottle can, and including an aluminum sheet, a resin film provided on a surface of the aluminum sheet which faces an internal space of the aluminum can, and an adhesive layer interposed between the aluminum sheet and the resin film and bonding the aluminum sheet and the resin film together, wherein the resin film includes a first resin layer as a topmost layer and a second resin layer containing a dimer acid-copolymerized polyester resin, and wherein only the adhesive layer contains calcium carbonate; and
a wine enclosed in the aluminum can, containing 4.3 mg/L or less of molecular $SO_2$ and 350 mg/L or less of chloride ions.

2. The aluminum-canned wine according to claim 1, wherein the resin film has a two-layered structure constituted by the first resin layer and the second resin layer.

3. The aluminum-canned wine according to claim 1, wherein the first resin layer contains an isophthalic acid-copolymerized polyester resin.

4. The aluminum-canned wine according to claim 1, wherein the adhesive layer contains a thermosetting epoxy resin.

5. The aluminum-canned wine according to claim 1, wherein the resin film further includes a third resin layer as an outermost layer facing the adhesive layer, and has a three-layered structure constituted by the first resin layer, the second resin layer, and the third resin layer.

6. The aluminum-canned wine according to claim 5, wherein the first resin layer contains an isophthalic acid-copolymerized polyester resin.

7. The aluminum-canned wine according to claim 5, wherein the adhesive layer contains a thermosetting epoxy resin.

8. The aluminum-canned wine according to claim 5, wherein the third resin layer contains an isophthalic acid-copolymerized polyester resin.

* * * * *